(12) United States Patent
Tessier et al.

(10) Patent No.: US 11,027,687 B2
(45) Date of Patent: Jun. 8, 2021

(54) STEERING WHEEL

(71) Applicant: AUTOLIV DEVELOPMENT AB, Vargarda (SE)

(72) Inventors: Jean Bernard Tessier, Poitiers (FR); Gilles Garret, Rouen (FR); Laurent Groleau, Quincay (FR); Sylvain Leforestier, Doudeauville (FR); Paul Lebarbier, Sotteville-les-Rouen (FR)

(73) Assignee: AUTOLIV DEVELOPMENT AB, Vargarda (SE)

( * ) Notice: Subject to any disclaimer, the term of this patent is extended or adjusted under 35 U.S.C. 154(b) by 554 days.

(21) Appl. No.: 15/781,021

(22) PCT Filed: Dec. 6, 2016

(86) PCT No.: PCT/EP2016/079886
§ 371 (c)(1),
(2) Date: Jun. 1, 2018

(87) PCT Pub. No.: WO2017/097761
PCT Pub. Date: Jun. 15, 2017

(65) Prior Publication Data
US 2020/0282940 A1 Sep. 10, 2020

(30) Foreign Application Priority Data
Dec. 8, 2015 (EP) .................................... 15198361

(51) Int. Cl.
*B60R 21/203* (2006.01)
*B62D 1/04* (2006.01)
*B60Q 5/00* (2006.01)

(52) U.S. Cl.
CPC .......... *B60R 21/2037* (2013.01); *B60Q 5/003* (2013.01); *B62D 1/046* (2013.01)

(58) Field of Classification Search
CPC ............................ B60R 21/2037; B60Q 5/003
See application file for complete search history.

(56) References Cited

U.S. PATENT DOCUMENTS

| 5,738,369 A * | 4/1998 | Durrani ................. | B60Q 5/003 280/728.2 |
| 6,402,193 B1 * | 6/2002 | Fleckenstein .......... | B60Q 5/003 200/61.55 |

(Continued)

FOREIGN PATENT DOCUMENTS

| DE | 101 00 257 A1 | 7/2002 | |
| DE | 102013008819 A1 * | 11/2014 | ......... B60R 21/2037 |

(Continued)

OTHER PUBLICATIONS

International Search Report and Written Opinion of PCT/EP2016/079886 dated Feb. 2, 2017.
European Search Report of EP 15 19 8361 dated Jun. 8, 2016.

*Primary Examiner* — Nicole T Verley
(74) *Attorney, Agent, or Firm* — Dickinson Wright PLLC

(57) ABSTRACT

A steering wheel having a steering wheel body (10) having a first force transmitting component, and a horn actuation element. The horn actuation element having a horn actuation surface (23) and having a second force transmitting component. A load cell (30) is provided having a sensitive element that changes at least one of its electrical properties in response to a compression force. The sensitive element placed between the first and second force transmitting components. At least one elastically deformable element is provided between the steering wheel body (10) and the horn actuation element. When a pushing force is applied to the horn actuation surface (23) the force applied to the sensitive element changes. In a resting state of the steering wheel a compression force is applied to the sensitive element by the first and second force transmitting components by a preload (Continued)

and in that the compression force applied to the sensitive element is reduced when a pushing force is applied to the horn actuation surface (23).

15 Claims, 9 Drawing Sheets

(56) References Cited

U.S. PATENT DOCUMENTS

| | | | | |
|---|---|---|---|---|
| 6,554,312 | B2* | 4/2003 | Sakane | B60Q 5/003 280/728.2 |
| 6,675,675 | B1* | 1/2004 | Sauer | B60R 21/2037 280/731 |
| 6,830,263 | B2* | 12/2004 | Xu | B60R 21/2037 280/728.2 |
| 7,490,852 | B2* | 2/2009 | Marotzke | B60Q 5/003 280/731 |
| 8,087,691 | B2* | 1/2012 | Nebel | B60R 21/2037 280/731 |
| 8,336,911 | B2* | 12/2012 | Hondier | B60R 21/2037 280/731 |
| 8,382,152 | B2 | 2/2013 | Radde et al. | |
| 8,419,052 | B2* | 4/2013 | Yamaji | B60R 21/2037 280/731 |
| 8,474,867 | B2* | 7/2013 | Nebel | B60R 21/2037 280/731 |
| 8,616,577 | B1* | 12/2013 | Matsu | B60R 21/2037 280/728.2 |
| 9,592,783 | B2* | 3/2017 | Nebel | B60R 21/217 |
| 10,391,934 | B2* | 8/2019 | Leforestier | H03K 17/9625 |

FOREIGN PATENT DOCUMENTS

| | | | | |
|---|---|---|---|---|
| DE | 112006004085 B4 * | 7/2020 | | B60Q 1/0082 |
| EP | 2 326 534 B1 | 6/2012 | | |
| FR | 2693870 A1 * | 1/1994 | | B60R 21/2037 |
| GB | 2309123 A * | 7/1997 | | B60Q 5/003 |
| GB | 2398277 A * | 8/2004 | | B60R 21/21658 |
| WO | WO 2013/009502 A2 | 1/2013 | | |
| WO | WO-2019183167 A1 * | 9/2019 | | B60R 21/2037 |
| WO | WO-2020053248 A1 * | 3/2020 | | B60Q 5/003 |
| WO | WO-2020131690 A1 * | 6/2020 | | B60Q 5/003 |

* cited by examiner

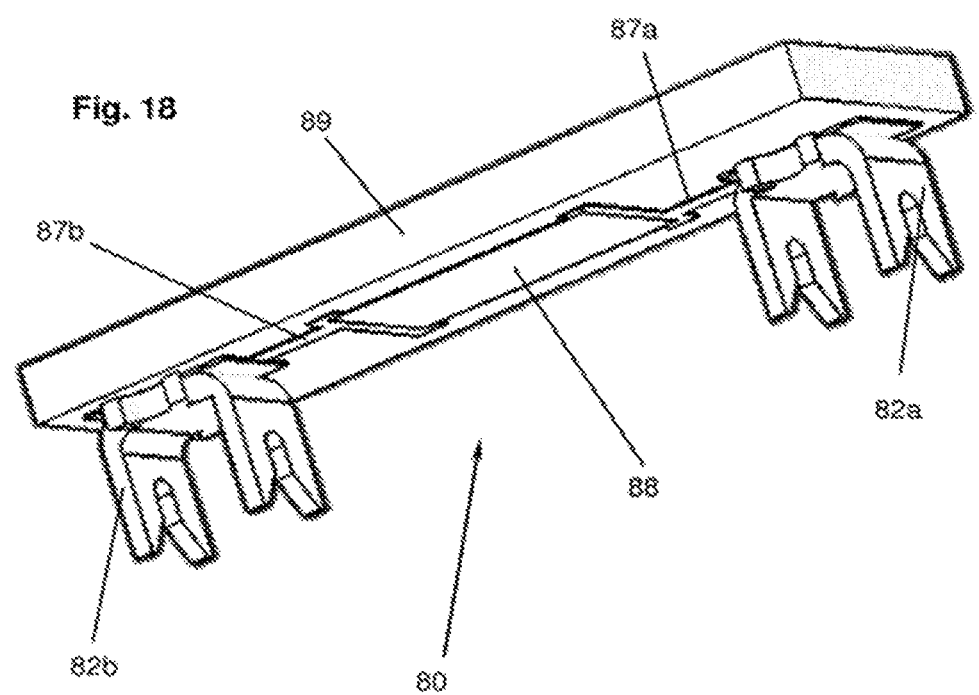

STEERING WHEEL

CROSS-REFERENCE TO RELATED APPLICATIONS

This application is a 35 U.S.C. § 371 national phase application of PCT International Application No. PCT/EP2016/079886, filed Dec. 6, 2016, which claims the benefit of priority under 35 U.S.C. § 119 to European Patent Application No. 15198361.6, filed Dec. 8, 2015, the contents of which are incorporated herein by reference in their entirety.

FIELD OF THE INVENTION

This invention relates to a steering wheel for a motor vehicle having a horn actuation element.

BACKGROUND

In almost every steering wheel of a passenger car, a bus or a truck, a horn switch is provided. For this purpose a horn actuation element of the steering wheel is held on the steering wheel body in such a way that it can be pressed down against the force of one or more springs. Mostly this horn actuation element is an airbag module or a part of the same, especially its cover. The surface of the cover serves as an activation surface of the horn switch. If the whole airbag module can be pressed down, one speaks usually of a floating-module concept, if only the cover is movable, one speaks usually of a floating-cover concept. Often more than one horn switch is present, but for the sake of simplicity reference is made to only one such horn switch in the following discussion.

In the simplest case, the horn switch is formed of a contact at the steering wheel body, a mating contact on the actuation element of the steering wheel, and a spring. As long as no force is applied to the actuation element, the contacts are spaced part from another by the influence of the spring. If the actuation element is pressed down against the force of the spring the two contacts come in contact with one another and close a circuit which leads to an actuation of the horn. One drawback of this design is that the contacts can be subjected to mechanical or electrical wearout.

The generic EP 2 326 534 B1 suggests to use a load cell in form of a strain gauge in a horn switch of a steering wheel. Load cells are resistors that change their electrical ohmic resistance in response to mechanical stress applied to them. A strain gauge is an example of a load cell. In the steering wheel described in EP 2 326 534 B1, a strain gauge is placed between a force transmitting component of the steering wheel body and a force transmitting component of the airbag module in such a way that the strain gauge is stressed when the airbag module is pressed down against the steering wheel body. The change of the electrical resistance of the strain gauge can be measured and the result of the measurement can be used for generating the horn actuation signal. In order to generate the horn actuation signal in response to the change of the electrical resistance of the strain gauge one needs an electrical circuit, for example in form of a control and an evaluation unit.

The use of a load cell has certain advantages over the use of "classic" contact type electrical switches. The most relevant are that only very small travelling distances between the steering wheel body and the horn actuation element (airbag module or its cover) are needed and that the load cells are free of wearout.

Starting from this prior art it is the task of this invention to further improve a steering wheel whose at least one horn switch includes a load cell.

SUMMARY

In accordance with the present invention, it has been found out that the use of a load cell that includes a so-called thick film strain gauge as a sensitive element being placed onto a rigid body has advantages over the use of conventional strain gauges. Such kinds of load cells are conventionally used in pressure measuring devices. A load cell of this type has two main advantages. First, its electrical response on a change of the mechanical stress is very precise which makes the evaluation of its signals relatively easy. Second, it deforms very little when pressure is applied to it. This property opens the way to a "travel-less" horn actuation meaning that horn actuation element (mostly the airbag module or a part of the same) does not move perceptively relative to the steering wheel body when pressure is applied to the horn actuation surface in order to operate the horn. This has advantages regarding the avoidance of rattling noises, the avoidance of wearout and the avoidance of uneven gaps between the airbag module and the steering wheel body.

But one problem arises in connection with the use of the above-referenced type of load cells, namely that such load cells are susceptible to mechanical shock. It happens relatively often that the driver's hand hits the horn actuation surface with high speed, for example because the driver is in anger. If a load cell with a rigid body was located such between the steering wheel body and the horn actuation element that the force applied to the load cell rises when a pushing force is applied to the actuation surface of the actuation element, a shock would be transmitted to the load cell which would eventually lead to mechanical failure of the same, for example by breakage of the rigid body.

To solve this problem, in accordance with the present invention, an elastically deformable element (for example, a compression spring) is still used, but the conventional construction is turned around. In an embodiment of the present invention the elastically deformable element and the sensitive element of the load cell are arranged such that in a resting state of the steering wheel a compression force is applied to the sensitive element by the first and second force transmitting components because of a preload of the at least one elastically deformable element and that the compression force applied to the sensitive element is reduced when a pushing force is applied to the horn actuation surface. This means that in the resting state of the steering wheel the sensitive element is already compression stressed and that the application of a pushing force to the actuation surface does not enhance but instead reduces the mechanical stress in the sensitive element, such that the risk of a breakage does not exist.

For the electronic detection of a horn actuation it is only necessary to measure a change of the mechanical stress in the load cell by measuring the change of its electrical properties (usually its ohmic resistance). The fact that the load sensitive element is pre-stressed in the resting state of the steering wheel only shifts the operating point of the measurement.

In an exemplary configuration of the present invention the first force transmitting component has a first force transmitting surface pointing towards the steering wheel body and the second force transmitting component has a second force transmitting surface pointing towards the horn actuation element. The sensitive element of the load cell is placed between the first force transmitting surface and the second force transmitting surface. It is preferred that the two force transmitting surfaces are parallel to one another and that the elastically deformable element (which usually is a compression spring) extends perpendicularly to them. This leads to an ideal force transmission into the sensitive element.

Of course the steering wheel should be is easy to assemble. In a first preferred embodiment this is achieved in that at least one of the first force transmitting component and the second force transmitting component is hook-shaped and at least one of the first force transmitting component and the second force transmitting component is elastically deformable in a non-axial direction. By this configuration, the airbag module can be snapped into the steering wheel body during assembly.

In a second preferred embodiment of the present invention, one of the force transmitting elements carries or includes an elastically deformable element, especially in form of a wire bracket such that a snapping assembly can be realised.

In an embodiment of the present invention, it is preferred that the elastically deformable element is a compression spring. It is further preferred that this compression is spring is preloaded with a relatively high force of for example 100 N. Assumed that three horn switches are present, this leads to a total force between the steering wheel body and the airbag module of 300 N, if the springs act directly between the steering wheel body and the housing. If no additional measures are taken this would lead to a mounting force over 300 N, which is too high at least for manual mounting. To solve this problem it is in the first embodiment preferred that in a pre-mounting state of the actuation element the spring is held in a more pre-stressed state than in the mounted state of the actuation element (usually the airbag module) by use of a holding element. By doing so the spring force does not have to be overcome during the final assembly step of the airbag module.

In a preferred embodiment the holding element is a sleeve that is deformable in a direction perpendicular to the longitudinal direction of the compression spring. This sleeve includes at least two inwardly projecting noses holding the compressed spring in the pre-mounting state. The deformability can especially be achieved by providing two slits in the sleeve such that the sleeve includes two sections with each of the sections having a nose.

To transmit the force of the spring a pusher can be used. In order to widen the sleeve during the assembly which leads to a release the spring, this pusher preferably includes at least one wedge-shaped section that deforms the sleeve during mounting of the horn actuation element such that the compression spring is released from the noses.

In a second preferred embodiment of the present invention, the load cell is placed onto or is a part of an intermediate plate located between the airbag housing and the steering wheel body. The intermediate plate can serve as the first or the second force transmitting component. This intermediate plate can be a circuit board, especially a printed circuit board, or such a circuit board can be a part of such an intermediate plate. In this case the sensitive element (especially the thick film strain gauge) can be placed directly onto a section of a surface of this circuit board such that the body of the circuit board which is usually made of an epoxy resin also serves as a body of the load cell whose sensitive element is for example a thick film strain gauge. According to the definitions chosen in this application the circuit board then forms one of the force transmitting elements and the sensitive element (the thick film strain gauge) is placed onto its surface.

The load cell used in accordance with the present invention is preferably of a type having rigid body, especially a ceramic body or a body made of an epoxy resin, and a thick film strain gauge as a sensitive element, but it is to be noted that the inventive concept is not limited to this kinds of load cells. If a body made of an epoxy resin is used, this body can be a section of a standard printed circuit board (PCB).

A further advantage of the inventive steering wheel is that the architecture can be similar to the architecture of a floating module steering wheel which means that the cover does not move relative to the housing so that there is no need for a clearance between the cover and the housing and the airbag. Additionally rattling noises and mechanical wearout can be avoided because the preload force of the elastic element(s) can be chosen quite high. But despite the fact that the preload force can be chosen high, the horn actuation force can be low since it is not necessary for the actuation force to exceed the preload force.

BRIEF DESCRIPTION OF THE DRAWINGS

The invention will now be described by means of preferred embodiments in view of the figures. The figures show:

FIG. 18 shows the load cell element shown in FIG. 16.

DETAILED DESCRIPTION

Figure 1:
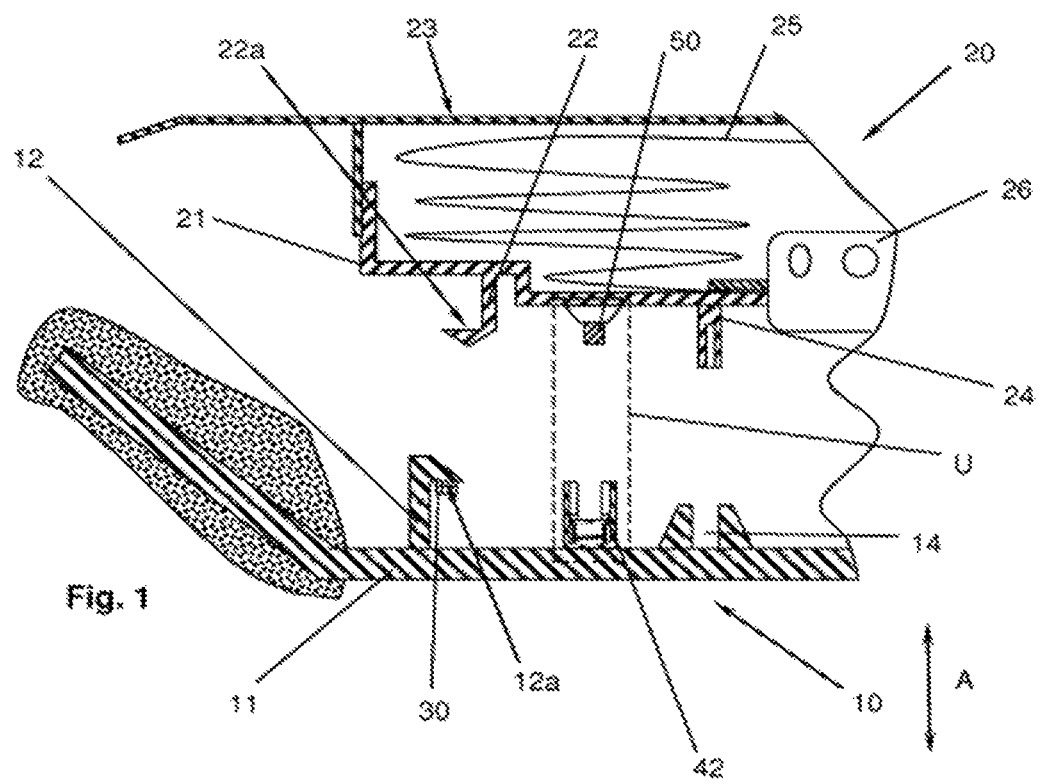
FIG. 1 shows a first embodiment of a steering wheel body and an airbag module to be mounted to the steering wheel body in a final assembly step in a schematic cross-sectional view.

FIG. 1 shows a first embodiment of the inventive steering wheel in a not finally assembled state. The steering wheel is includes the steering wheel body 10 having a skeleton, and an airbag module 20. This airbag module 20 includes an airbag housing 21, an airbag 25 folded into the housing 21 and an inflator in form of a gas generator 26. The surface of the cover of the housing 21 serves as the actuation surface 23 for actuating the horn of the car.

A guiding pin 24 and a guiding hole 14 for receiving the guiding pin 24 are present in order to position the airbag module 20 in the radial direction on the steering wheel body 10. Of course, more than one pair of a guiding pin and a guiding hole can be present (not shown in the figures). In the embodiment shown the guiding pin 24 extends from the floor of the airbag housing 21 and the guiding hole 14 is provided in the steering wheel body 10, but this can of course be vice versa.

Now an embodiment of the inventive horn switch is described. In most cases more than one such a horn switch will be provided, for example, three of them (not shown in the figures). Further it is to be noted that the elements on the module side can also be on the steering wheel body side and vice versa but in order to avoid redundancies, only one embodiment is described.

Figure 10:
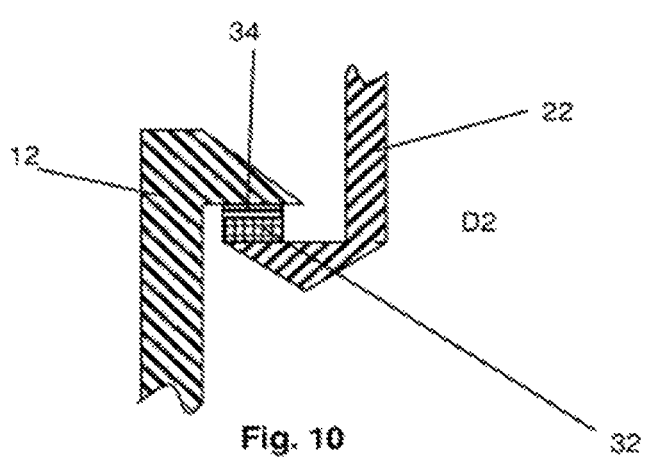
FIG. 10 shows the detail D2 of FIG. 8.

A first force transmitting element in form of a first hook 12 extends from the steering wheel body 10. This first hook 12 can be made in once piece with the skeleton 11 of the steering wheel body 10, but this is not mandatory. In the embodiment described the first hook 12 is basically rigid and carries the load cell 30 which is provided in the form of a ceramic body 32 and a thick film strain gauge 34, as can schematically be seen in FIG. 10. A second force transmitting element 22 in form of a second hook 22 extend from the airbag housing 21, in the embodiment shown namely from the floor of the airbag housing 21. This second hook 22 is elastically deformable in a direction perpendicular to the axial direction A. Also here, the second hook 22 can be made in one piece with the airbag housing 21, but this is again not mandatory. The first force transmitting element (first hook 12) and the second force transmitting element (second hook 22) each have a contact surface, namely the first contact surface 12a and the second contact surface 22a. The two contact surfaces 12a, 22a are in the state shown in FIG. 1 and in the final assembled state parallel to one another but have an opposing orientation. The first contact surface 12a points towards the steering wheel body 10 and the second contact surface 22a points towards the airbag housing 21. As will be seen later the two contact surfaces 12a, 12b apply a pressing force onto the load cell 30 then the steering wheel is in its assembled state.

The horn switch additionally includes a spring unit U. It is preferred that at least one (further preferably exactly one) such a spring unit U is allocated to one load cell 30 and provided near the pair of force transmitting elements 12, 22, but this is not mandatory. The spring unit includes a pusher 50 and a compression spring 40 located in a sleeve 42. In the embodiment shown the pusher 50 is connected to a part of the airbag housing 21 and the sleeve 42 is connected to the steering wheel body, especially the skeleton 11, but this could be also the other way round. The spring unit U will be described later in more detail with reference to FIGS. 5a to 7b. For the following it is sufficient to know that the compression spring 40 is held in the sleeve 42 in a pre-stressed state.

Figure 2:
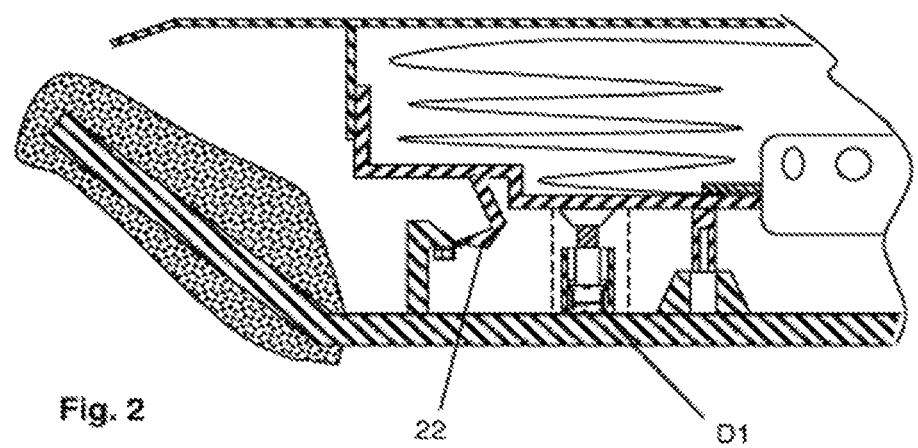
FIG. 2 shows what is shown in FIG. 1 during the assembly of the airbag module to the steering wheel body in a first intermediate position.

FIG. 2 shows the airbag module 20 during mounting to the steering wheel body 10 in a first position. When the airbag module 20 is mounted to the steering wheel body 10 in a final assembly step it is moved in the axial direction A towards the steering wheel body 10. By doing so the guiding pin 24 enters the guiding hole 14, the pusher 50 enters the sleeve 42 and the second hook 22 is deformed because it comes into contact with the first hook 12.

Figure 3:
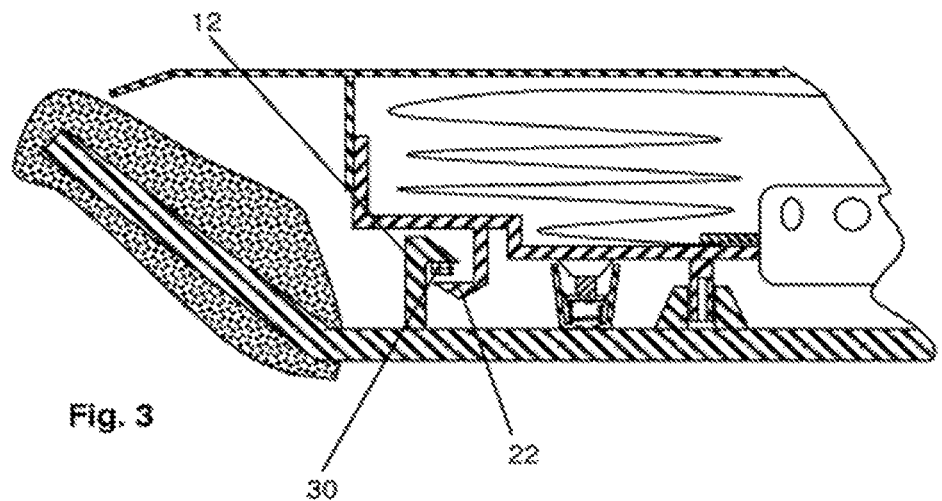
FIG. 3 shows what is shown in FIG. 2 in a further intermediate position following the position of FIG. 2.
Figure 4:
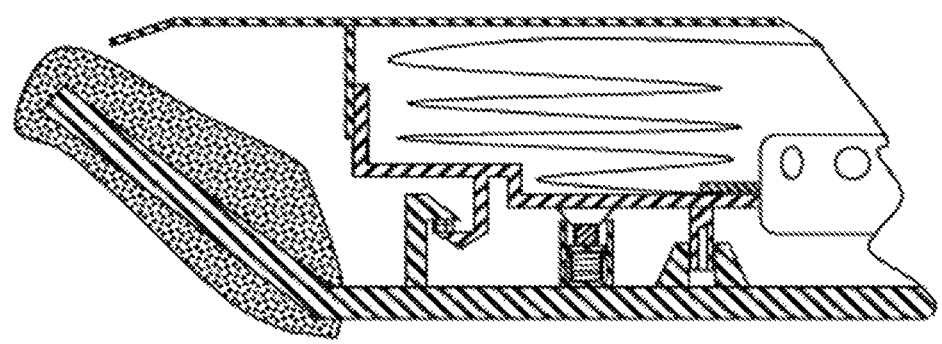
FIG. 4 shows what is shown in FIG. 3 in the final (assembled position)

When the airbag module is further moved towards the steering wheel body 10 the second hook 22 snaps back and in the lowest mounting position the second contact surface 22a is not abutting the load cell 30. In this lowest mounting position as is shown in FIG. 3 the pusher 50 unlocks the compression spring 40 from its initial pre-stressed state such that it comes directly or indirectly in contact with a central part 52 of the pusher, such that it presses the airbag module 20 away from the steering wheel body 10. This back movement is limited by the second contact surface 22a and the load cell 30 which come in contact to one another as is shown in FIG. 4 which shows a final assembled state.

The FIGS. 5a to 7b show the sleeve 42, the compression spring 40 (whose end is covered by a force transmitting end cap 48) and the pusher 50 in more detail and it is explained how the pusher releases the compression spring 40 from its initial pre-stressed state into its assembled preloaded state (in which it is little less preloaded than in its initial pre-stressed state).

Figure 5A:
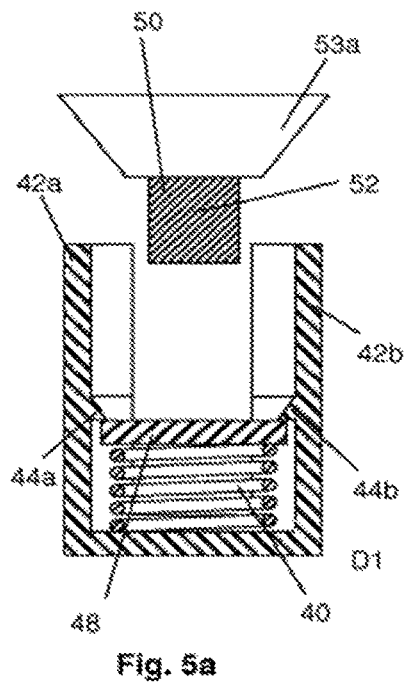
FIG. 5a shows the detail D1 of FIG. 2.
Figure 5B:
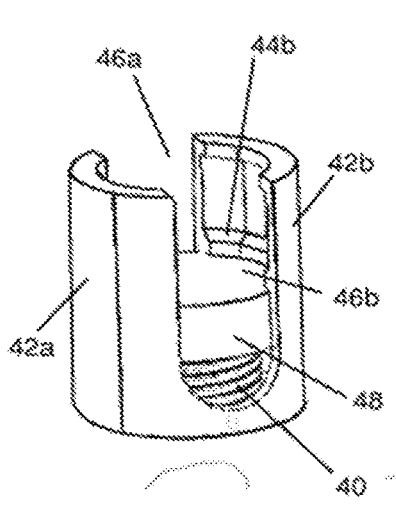
FIG. 5b shows the sleeve, the compression spring and the force transmitting end cap of FIG. 5a in a perspective view.

With reference to FIGS. 5a and 5b, the form of the sleeve 42 is explained: The sleeve 42 has basically the shape of a hollow cylinder that has one closed and one open end. Two slits 46a, 46b extend from the open end towards the closed end, such that the sleeve 42 is divided into two sections 42a, 42b. The sleeve 42 is made of a resilient material, for example a plastic material. Both sections 42a, 42b form a nose 44a, 44b projecting from their insides. The compression spring 40 extends from the closed end of the sleeve to a force transmitting end cap 48 and presses the same against the noses 44a, 44b, because the compression spring 40 is in a pre-stressed state. For example it can be pre-stressed with about a little more than 100 Newton.

Figure 6A:
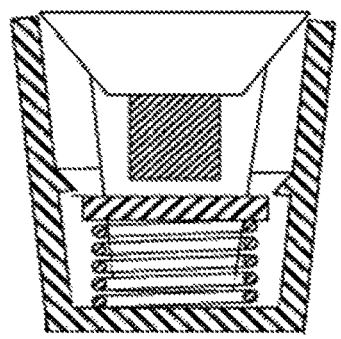
FIG. 6a shows what is shown in FIG. 5a in the state of FIG. 3.
Figure 6B:
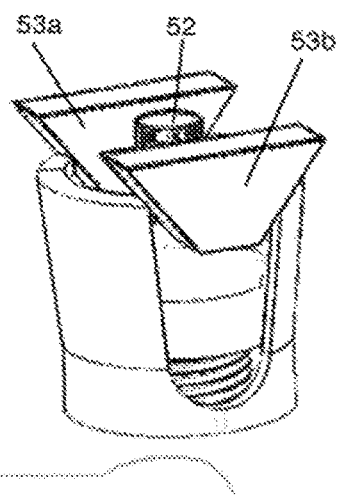
FIG. 6b shows what is shown in FIG. 6a in a representation according to FIG. 5b.

As one can see especially from FIG. 6b, the pusher 50 is formed of three sections, namely a central part 52 and two wedge-shaped sections 53a, 53b which are arranged on opposing sides of the central part 52 of the pusher. The lower ends of the wedge-shaped sections 53a, 53b have a width which is smaller than the width of the slits 46a, 46b, while the upper ends of the wedge-shaped sections 53a, 53b have a width which is larger than the width of the slits 46a, 46b. Preferably the central part 52 of the pusher 50 extends over the lower ends of the wedge-shaped sections (but this is not mandatory).

Figure 7A:
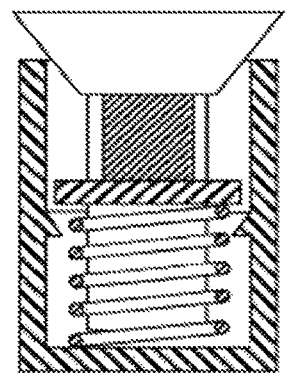
FIG. 7a shows what is shown in FIG. 6a in the mounted (final assembled) state according to FIG. 4.
Figure 7B:
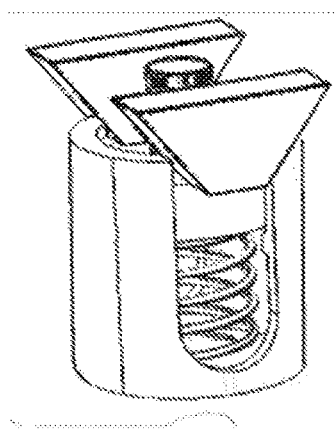
FIG. 7b shows what is shown in FIG. 7a in a representation according to FIG. 6b.

When the pusher 52 lower part is lowered into the sleeve 42, the wedge-shaped sections 53a, 53b press the sections 42a, 42b of the sleeve 42 away from each other, such that the noses 44a, 44b can no longer hold the force transmitting end cap 48 of the compression spring 40, as can best be seen FIG. 6a. So, the compression spring 40 is released and expands until the force transmitting end cap 48 hits the contact surface of the central part 52 of the pusher 50 (FIG. 7a, 7b). If no external force is applied to the airbag module

Figure 8:
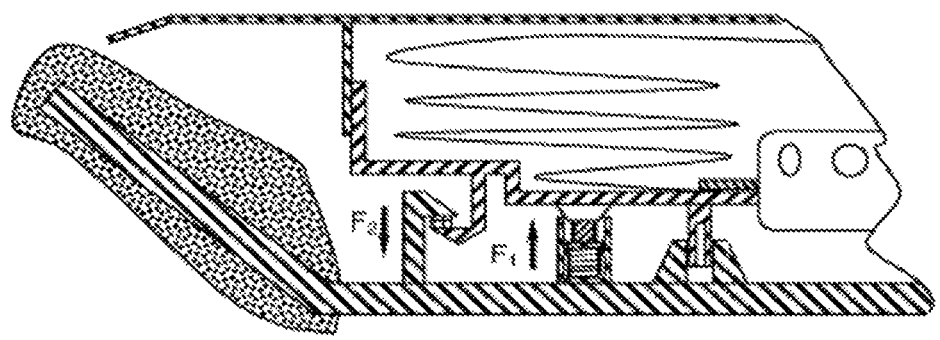
FIG. 8 shows what is shown in FIG. 4 with the forces which act when the steering wheel is in its resting state and no force is applied to the actuation surface of the airbag module.

20, the force of the (still loaded) compression spring 40 presses the second contact surface 22a against the load cell 30 which is again pressed against the first contact surface 12a. Consequently, if the steering wheel is free of outer forces the force of the compression spring F1 is the same as the force F2 applied to the load cell 30. This is shown in FIG. 8. A typical force of F1 and thus F2 can be, as has already been mentioned, for example 100 Newton.

Figure 9:
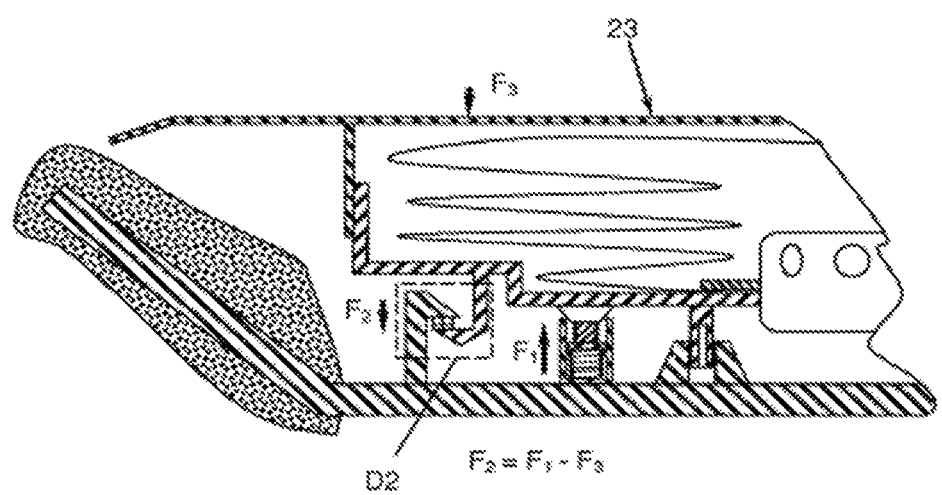
FIG. 9 shows what is shown in FIG. 8 when a pushing force is applied to the actuation surface.

If the driver now pushes against the actuation surface 23 in order to actuate the horn, the applied force will usually be lower than the force F1 of the compression spring 40. This force F3 will typically be for example around 20 to 40 Newton. Of course, the force F2 applied to the low cell is reduced by the amount of the force F3 applied to the actuation surface 23, as is shown in FIG. 9. The drop in force leads to a drop of the compressive stress in the load cell 30 which again leads to the change of the ohmic resistance of the load cell which can be measured by known electronic circuits. As long as the force F3 applied to the actuation surface 23 is less than the preload force F1 of the compression spring 40 the airbag module 20 will not move relative to the steering wheel body. So the horn actuation system is completely travel-less, with the exception of minute displacements caused by straining in load cell ceramic body 32.

Figure 11:
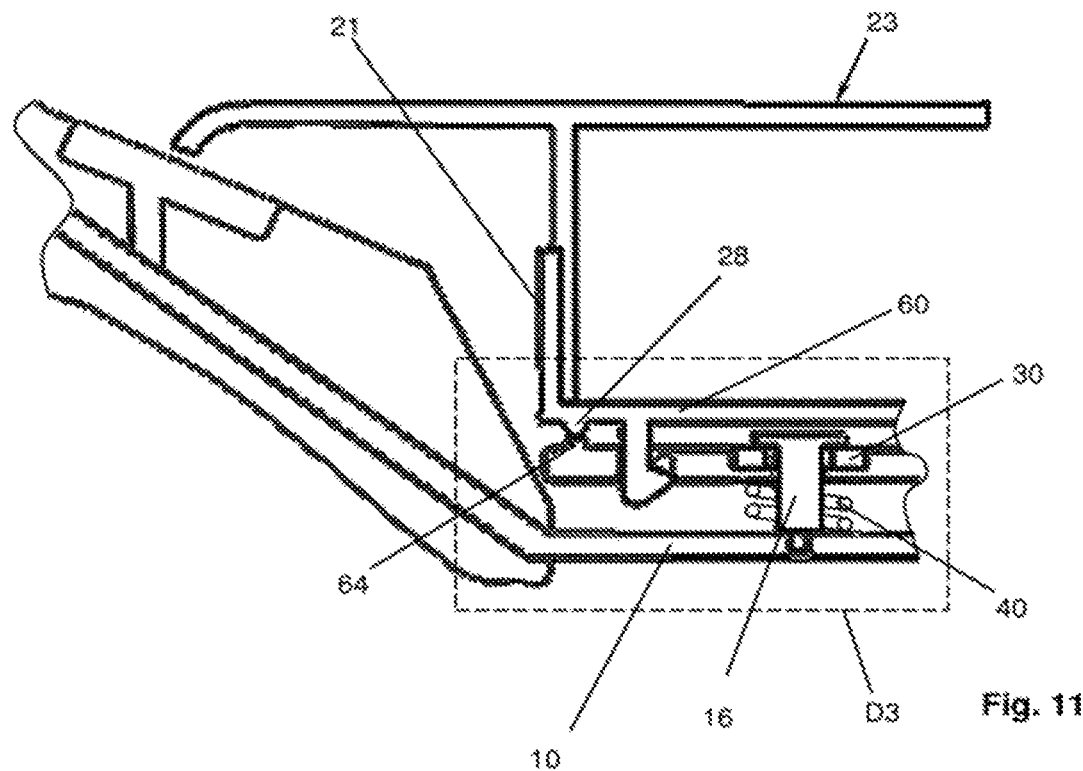
FIG. 11 shows a second embodiment of the invention in a representation basically according to FIG. 4.
Figure 12:
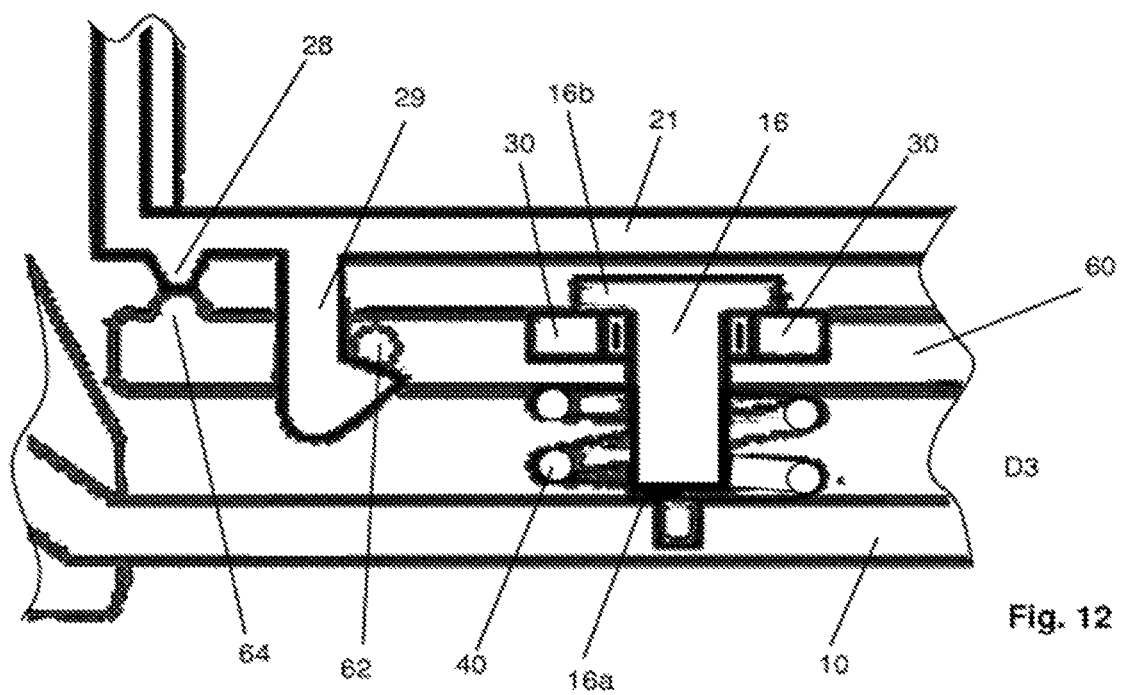
FIG. 12 shows the detail D3 of FIG. 11.

FIGS. 11 and 12 show a second embodiment of an inventive travel-less steering wheel. Here, the first force transmitting component being connected to the steering wheel body 10 is a shoulder nut 16, and the second force transmitting component is an intermediate plate 60 being non-movably connected to the housing 21, namely the bottom of the housings 21. The shoulder nut extends through a hole in the intermediate plate 60. The at least one load cell 30 is connected to the upper side of the intermediate plate 60 pointing towards the airbag module 20 or forms a part of the upper side of the intermediate plate 60. The load cell or load cells 30 can be a part of a circuit board, for example a printed circuit board. In this case it is possible that a section of the epoxy body of the printed circuit board forms the body of the load cell and that the sensitive element (for example a thick film strain gauge) is directly placed onto a surface of the epoxy body of the printed circuit board. In this case the circuit board constitutes both: the body of the load cell as well as the second force transmitting component.

The pre-stressed compression spring 40 acts between the steering wheel body 10 and the intermediate plate 60 and it is preferred (although not necessary) that this compression spring 40 encircles the lower part 16a of the shoulder nut 16. The upper part 16b of the shoulder nut 16 presses onto the load cell 30 because of the force of the compression spring 40. The connection between the housing 21 and the intermediate plate 60 is achieved by a mounting hook 29 being snapped into a wire bracket 62, and a pair of protrusions 28, 64 with one protrusion extending from the housing 21 and one protrusion extending from the intermediate plate 64. In this shown case the mounting hook 29 extends from the housing 21 and the wire bracket 62 is held on the intermediate plate 60, but this could be of course vice versa. Further it needs to be noticed, that the shown type of connection between the airbag housing 21 and the intermediate plate 60 is preferred, but that our kinds of connection (for example simply by screwing) would in principle also be possible.

The assembly of the steering wheel according to the second embodiment is as follows: In a first assembly step the shoulder nut 16 is inserted through the hole in the intermediate plate 60 such that the upper part 16b be of the shoulder nut 16 abuts the sensitive element of the load cell 30. After putting the compression spring 40 around the lower part 16b of the shoulder nut 16, the shoulder nut 16 is screwed into the steering wheel body 10 such that the compression spring 40 comes under tension and the sensitive element is under permanent compression stress. Now the airbag housing 21 is snapped onto the intermediate plate 60. It is to be noted that although the intermediate plate 60 is first mounted to the steering wheel body, it is a part of the airbag module 20 according to the definitions of this application.

The principle of working is basically as described above: when a pushing force is applied to the actuation surface 23 (the roof of the airbag module) this pushing force is transmitted to the intermediate plate 60 via the protrusions 28, 64. As long as this pushing force is less than the preload force of the compression spring 40, the airbag module 20 will not move relative to the steering wheel body, the force applied to the load cell decreases.

It would also be possible to connect the intermediate plate 60 to the airbag housing 21 via the shoulder nut and the compression spring and to rigidly connect the intermediate plate (for example by snapping) to the steering wheel body. In this case the intermediate plate would be the first force transmitting component being a part of the steering wheel body.

Figure 13:
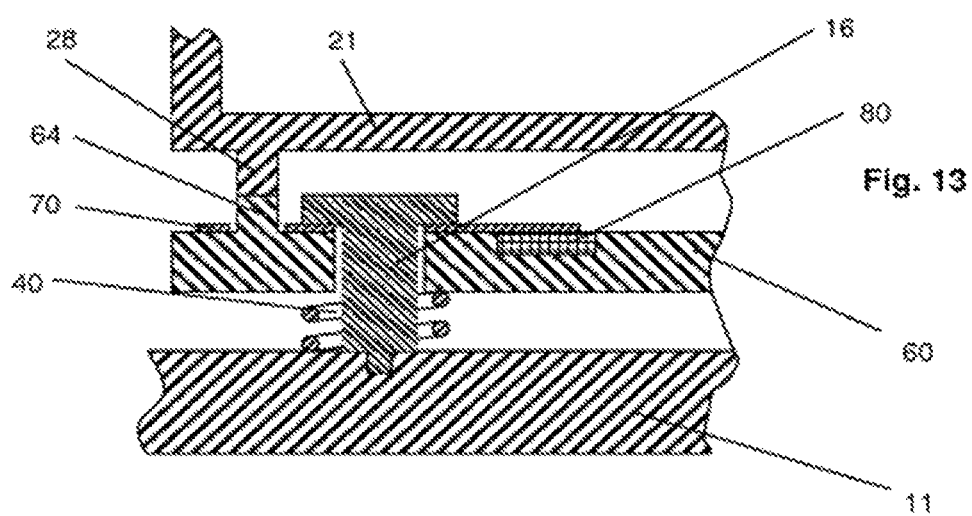
FIG. 13 shows a variation of what is shown in FIG. 12 in a representation similar to the representation of FIG. 12.
Figure 14:
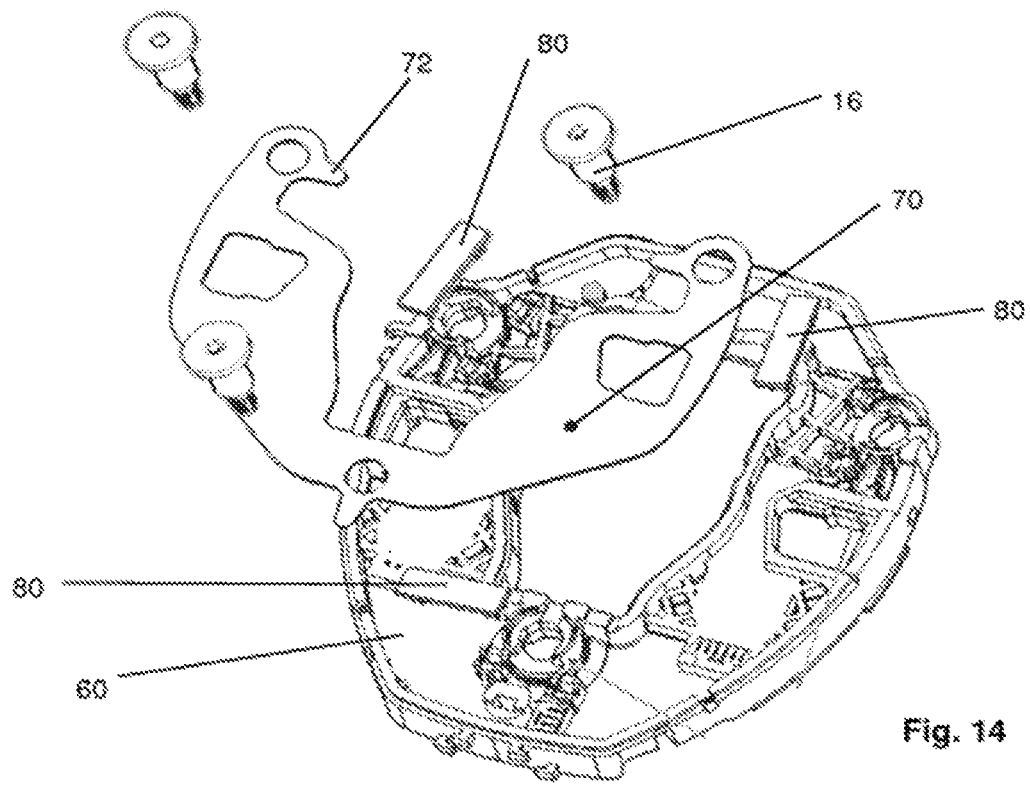
FIG. 14 shows the concept shown in FIG. 13 in a detailed perspective view showing the intermediate plate (horn plate) and an additional metal plate.
Figure 15:
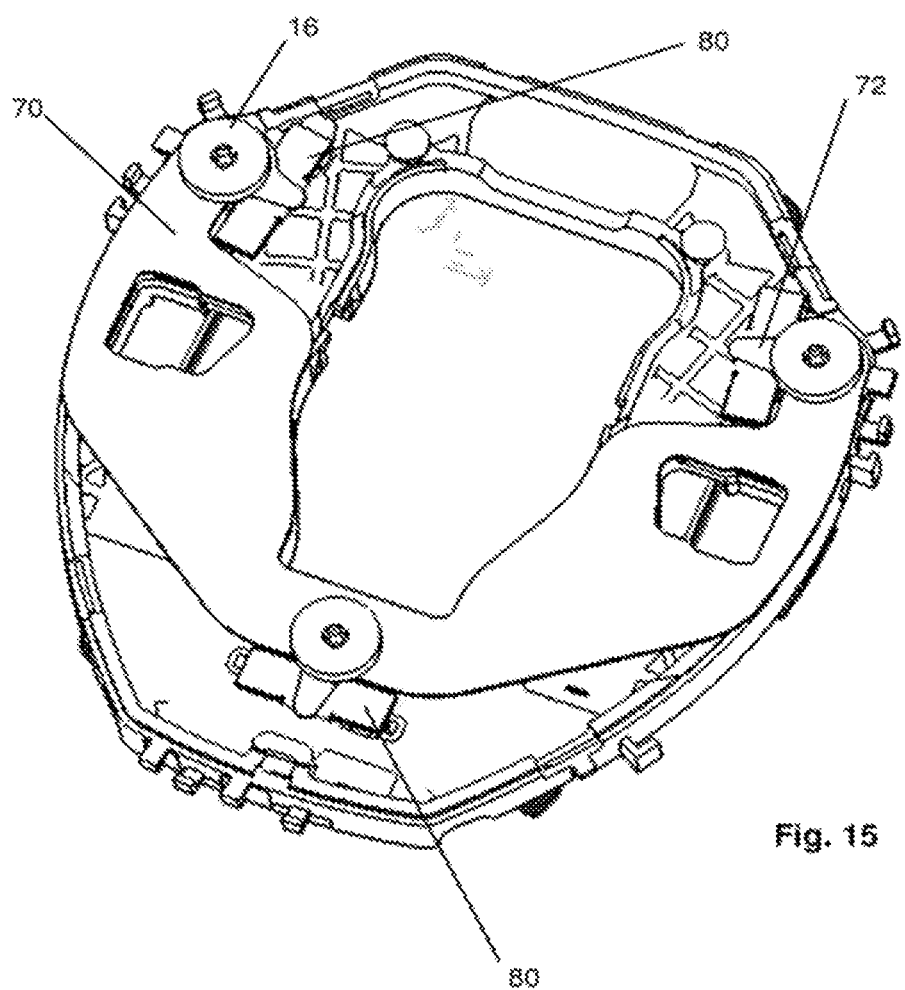
FIG. 15 shows what is shown in FIG. 14 after the metal plate has been mounted to the intermediate plate.

FIGS. 13 to 15 show a variation of the second embodiment. Herein FIG. 13 is strongly schematic (as are FIGS. 11 and 12) and FIGS. 14 and 15 show this concept in more detail. The main difference in respect to the embodiment shown in FIGS. 11 and 12 is that an additional metal plate 70 is provided. This additional metal plate 70 is located on the upper side (pointing towards the airbag module) of the intermediate plate 60 (which could also be referred to as the horn plate). One main effect of this metal plate 70 is that it enhances the overall integrity of the steering wheel, especially when the airbag is deployed. In contrast to the intermediate plate 60, which is usually a rather complex formed injection moulded plastic element, the metal plate 70 can be a simple, flat stamped-out piece of sheet metal. This metal plate 70 is not rigidly connected to the intermediate plate 60, it is only held to this intermediate plate 60 by means of the shoulder nuts 16 extending through this intermediate plate 60 and the metal plate 70, as can be seen from FIGS. 13 to 15. As one can see especially from FIGS. 14 and 15 (in FIG. 13 this is only shown very schematically) the metal plate 70 has a force transmitting finger 72 next to each shoulder nut 16 (meaning next to an opening in this metal plate 70 through which a shoulder nut extends in the assembled state). Each of these force transmitting fingers 72 presses onto a load cell element 80 mounted to the intermediate plate 60.

When the airbag module 20 is pressed down and thus the intermediate plate 60 is also pressed down against the steering wheel body 10, the pressure applied to the load cell elements 80 by the force transmitting fingers 72 is reduced the same way as described above with reference to FIGS. 11 and 12, such that the basic working principle is identical with the difference that the heads of the shoulder nuts 16 do not press directly onto the load cell elements 80, but indirectly via the force transmitting fingers 72.

Figure 16:
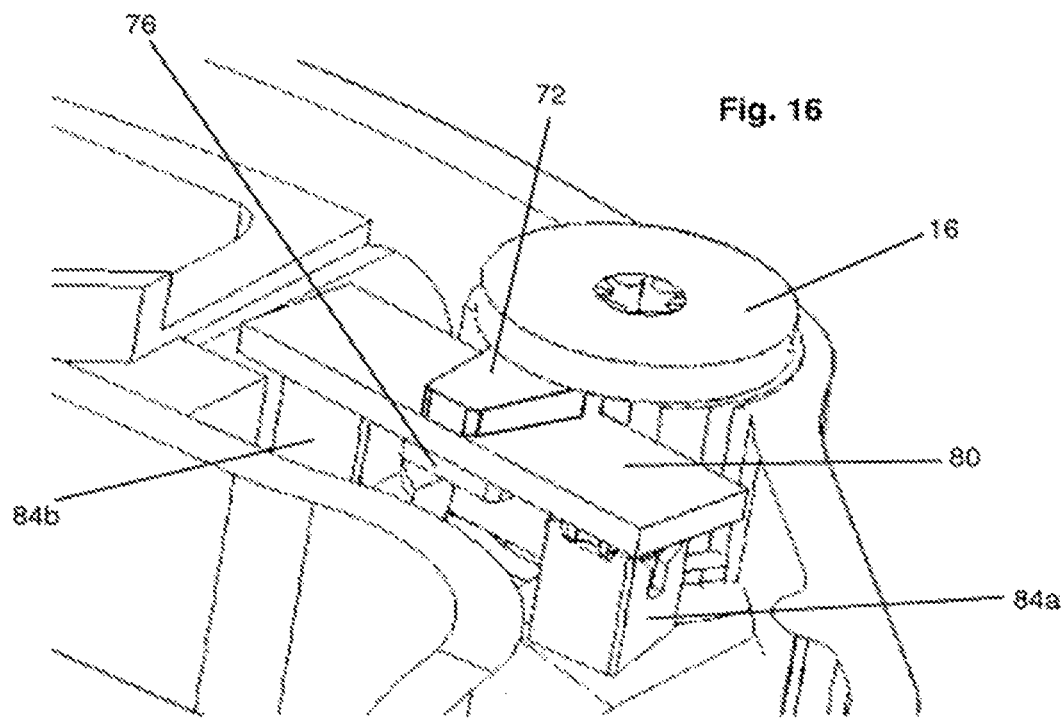
FIG. 16 shows clip-in a load cell element snapped to the intermediate plate (horn plate) and a force transmitting finger pressing onto the clip-in load cell element.
Figure 17:
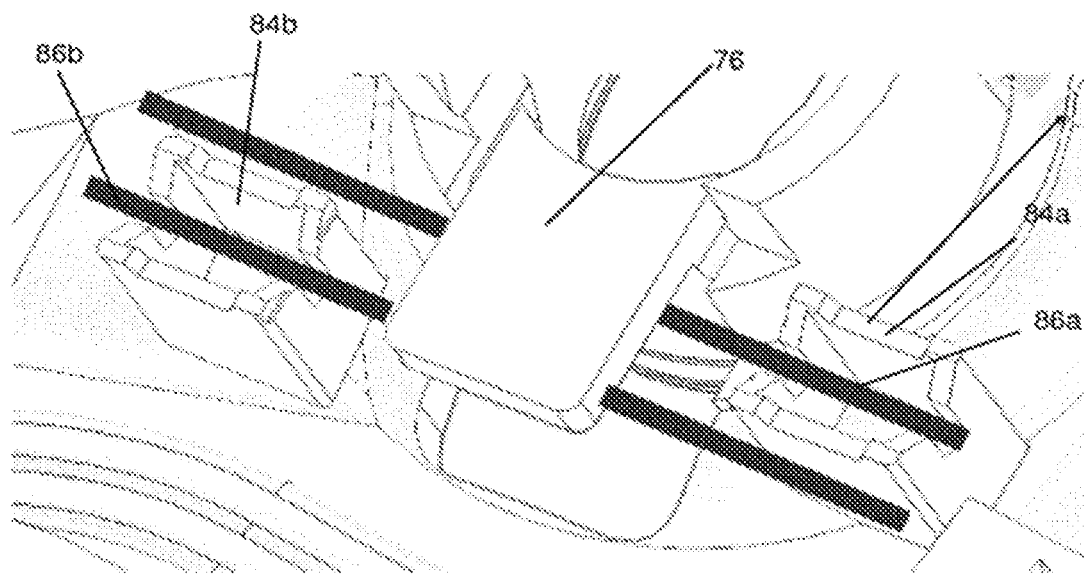
FIG. 17 shows what is shown in FIG. 16 but without the clip-in load cell element but with insulated wires held in wire holding receiving elements.

FIGS. 16 to 18 show a clip-in load cell element 80 which is mechanically and electrically connected to the intermediate plate 60 by means of a simple clip-in (or snap-in) process. This system can especially be applied to a steering wheel as (in parts) is shown in FIGS. 14 to 15, but this concept is not limited to embodiments having a metal plate. FIG. 16 shows such a clip-in load cell element 80 mounted to the intermediate plate 60. A force transmitting finger 72 presses onto the upper surface of this clip-in load cell element 80 as was just described in view to FIGS. 14 and 15. This force transmitting finger 72 can be a part of a metal plate (as described), but this is not necessarily the case. As can also be seen from FIG. 16 and even better from FIG. 17 a press-on section 76 of the intermediate plate 60 is located under the clip-in load cell element 80 such that the force transmitting finger 72 presses a section of the clip-in load cell element 80 onto this press on section 76 as long as no outer force is applied to the airbag module. As can also be seen from FIG. 16 and even better from FIG. 17 the clip-in load cell element 80 is clipped into wire holding receiving elements 84a and 84b. Each of these wire holding receiving elements 84a and 84b hold an insulated wire 86a and 86b (not shown in FIG. 16).

As can best be seen from FIG. 18 each clip-in load cell element 80 is comprised of a carrier 89 made of an insulating material, two wire de-insulating clip-in elements 82a and 82b, a strain gauge 88 and two electrical connections 87a and 87b connecting this strain gauge 88 to the wire de-insulating clip in elements 82a and 82b. The two wire de-insulating clip in elements 82a and 82b are each shaped to be clipped into one of the wire holding receiving elements 84a and 84b and includes at least one blade for cutting through the insulation of an insulated wire 86a 86b.

When the clip-in load cell element 80 is mounted to the intermediate plate 60, wire de-insulating clip element 82a is inserted into wire holding receiving element 84a and wire de-insulating clip-in element 82b is inserted into wire holding receiving element 84b such that two snap connections are established. During this snap-in process the two wire de-insulating clip-in elements 82a and 82b each de-insulate a section of their allocated insulated wire 86a, 86a, such that an electrical connection between the two wires 86A, 86B through the strain gauge 88 is established.

In the completely assembled state the force transmitting finger 72 presses onto the carrier 89 which in turn presses the strain gauge 88 onto the press-on section 76. This pressing force is reduced as soon as the intermediate plate 60 is pressed down against the steering wheel body 10 as has been described above.

While the above description constitutes the preferred embodiment of the present invention, it will be appreciated that the invention is susceptible to modification, variation and change without departing from the proper scope and fair meaning of the accompanying claims.

The invention claimed is:

1. A steering wheel comprising:
a steering wheel body having or being connected to a first force transmitting component,
a horn actuation element mounted to the steering wheel body, the horn actuation element having a horn actuation surface and the horn actuation element having or being connected to a second force transmitting component,
a load cell comprising a sensitive element that changes an electrical property in response to a compression force, the sensitive element being placed between the first force transmitting component and the second force transmitting component,
at least one elastically deformable element acting between the steering wheel body and the horn actuation element, such that when a pushing force is applied to the horn actuation surface, magnitude of the compression force changes,
in a resting state of the steering wheel body the compression force is applied to the sensitive element by the first and second force transmitting components by a preload provide by the at least one elastically deformable element, and in that the magnitude of the compression force applied to the sensitive element is reduced when the pushing force is applied to the horn actuation surface.

2. A steering wheel according to claim 1, wherein in that the load cell comprises a thick film strain gauge as the sensitive element being placed onto a body.

3. A steering wheel according to claim 1,
wherein the first force transmitting component comprises a first force transmitting surface pointing towards the steering wheel body,
the second force transmitting component has a second force transmitting surface pointing towards the horn actuation element, and
the load cell is placed between the first force transmitting surface and the second force transmitting surface.

4. A steering wheel according to claim 3, further comprising in that at least one of the first force transmitting component and the second force transmitting component is hook-shaped.

5. A steering wheel according to claim 3, further comprising in that at least one of the first force transmitting component and the second force transmitting component is elastically deformable in a non-axial direction.

6. A steering wheel according to claim 5, further comprising, the elastically deformable element is a compression spring and that in a pre-mounting state of the actuation element the spring is held in a more compressed state than in a mounted state of the actuation element by a holding element.

7. A steering wheel according to claim 6, further comprising, the holding element is a sleeve that is deformable in a direction perpendicular to the longitudinal direction of the compression spring, wherein the sleeve comprises at least one inwardly projecting nose holding the compressed spring in the pre-mounting state.

8. A steering wheel according to claim 7, further comprising, the sleeve has two slits such that the sleeve comprises two sections with each of the sections having the nose.

9. A steering wheel according to claim 6, further comprising, a pusher that transmits the compression force exerted by the compression spring when the horn actuation element is mounted to the steering wheel body, wherein the pusher comprises at least one wedge-shaped section that deforms the sleeve during mounting of the horn actuation element such that the compression spring is released from the at least one nose.

10. A steering wheel according to claim 1, further comprising the horn actuation element is an airbag module or a part of the airbag module.

11. A steering wheel according to claim 10, further comprising, the load cell is located at an intermediate plate located between an airbag housing of the airbag module and the steering wheel body.

12. A steering wheel according to claim 1, further comprising the sensitive element is a part of or attached to a circuit board.

13. A steering wheel according to claim 2, further comprising, the body is a section of an epoxy body of a printed circuit board and that the thick film strain gauge is placed onto a surface of the epoxy body of the printed circuit board.

14. A steering wheel according to claim 1, further comprising, upon the change of the magnitude of the compression force caused by the pushing force results in the change of the electrical property causing an actuation of a horn.

15. A Steering wheel according to claim 14, wherein the compression force remains acting on the sensitive element upon the actuation of the horn.

\* \* \* \* \*